Nov. 20, 1962 M. E. DOUGHARTY 3,065,433
RADIO TRANSMITTING APPARATUS AND METHODS
Filed March 23, 1959 9 Sheets-Sheet 1

INVENTOR.
MARVIN E. DOUGHARTY
BY Hayden & Pravel
ATTORNEY

Nov. 20, 1962  M. E. DOUGHARTY  3,065,433
RADIO TRANSMITTING APPARATUS AND METHODS
Filed March 23, 1959  9 Sheets-Sheet 3

INVENTOR.
MARVIN E. DOUGHARTY
BY
Hayden + Pravel
ATTORNEY

Nov. 20, 1962  M. E. DOUGHARTY  3,065,433
RADIO TRANSMITTING APPARATUS AND METHODS
Filed March 23, 1959  9 Sheets-Sheet 5

INVENTOR.
MARVIN E. DOUGHARTY
BY Hayden + Pravel
ATTORNEY

Nov. 20, 1962 M. E. DOUGHARTY 3,065,433
RADIO TRANSMITTING APPARATUS AND METHODS
Filed March 23, 1959 9 Sheets-Sheet 6

INVENTOR.
MARVIN E. DOUGHARTY
BY Hayden & Pravel
ATTORNEY

Nov. 20, 1962  M. E. DOUGHARTY  3,065,433
RADIO TRANSMITTING APPARATUS AND METHODS
Filed March 23, 1959  9 Sheets-Sheet 7

INVENTOR.
MARVIN E. DOUGHARTY
BY Hayden + Prawl
ATTORNEY

Nov. 20, 1962  M. E. DOUGHARTY  3,065,433
RADIO TRANSMITTING APPARATUS AND METHODS
Filed March 23, 1959  9 Sheets-Sheet 8

INVENTOR.
MARVIN E. DOUGHARTY
BY Hayden & Krauel
ATTORNEY

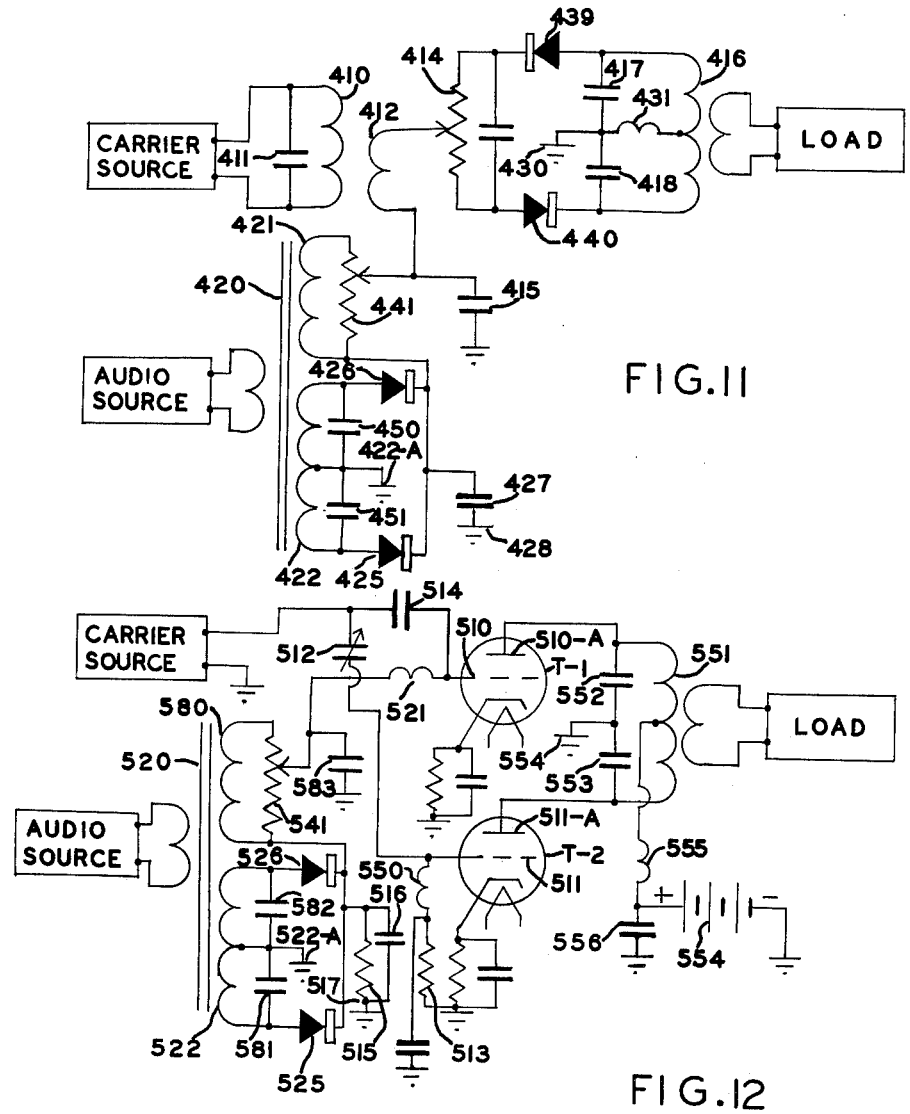

United States Patent Office 3,065,433
Patented Nov. 20, 1962

3,065,433
RADIO TRANSMITTING APPARATUS AND
METHODS
Marvin E. Dougharty, 3518 Dalstrom St.,
Houston 21, Tex.
Filed Mar. 23, 1959, Ser. No. 801,244
5 Claims. (Cl. 332—38)

This invention relates to high frequency radio transmitting systems, and particularly to apparatus and methods for controlling the transmission of the carrier wave in such systems.

This application is a continuation-in-part of United States patent application Serial No. 598,912 filed July 19, 1956, now abandoned.

One object of this invention is to provide a new and improved apparatus and method for the modulation of radio transmitters wherein the total power input efficiency is increased as compared to conventional amplitude modulated radio transmitters.

Another object of this invention is to provide a new and improved apparatus and method for the modulation of radio transmitters wherein all of the radio frequency carrier power output from the transmitter is utilized in conveying the desired audio intelligence.

An important object of this invention is to provide a new and improved apparatus and method for the modulation of radio transmitters wherein the degree of modulation is 100% for any value of the modulation voltage.

A further object of this invention is to provide a new and improved apparatus and method for the modulation of radio transmitters wherein means are provided for safeguarding against over-modulation by the negative half cycle of the audio modulating voltage.

A still further object of the invention is to provide a new and improved apparatus and method for the modulation of radio transmitters wherein the radio frequency carrier is suppressed during the time that no audio modulating voltage exists.

A particular object of this invention is to provide a new and improved apparatus and method for the modulation of radio transmitters which affords a convenience in reception which is superior to the suppressed carrier double side band form of modulation by eliminating the necessity for the re-insertion of the carrier frequency at the radio receiver.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIGS. 9, 10, 11 and 12 are electrical circuit diagrams illustrating several embodiments of the electrical apparatus of this invention which may be used in carrying out the method of this invention;

Figure 1:
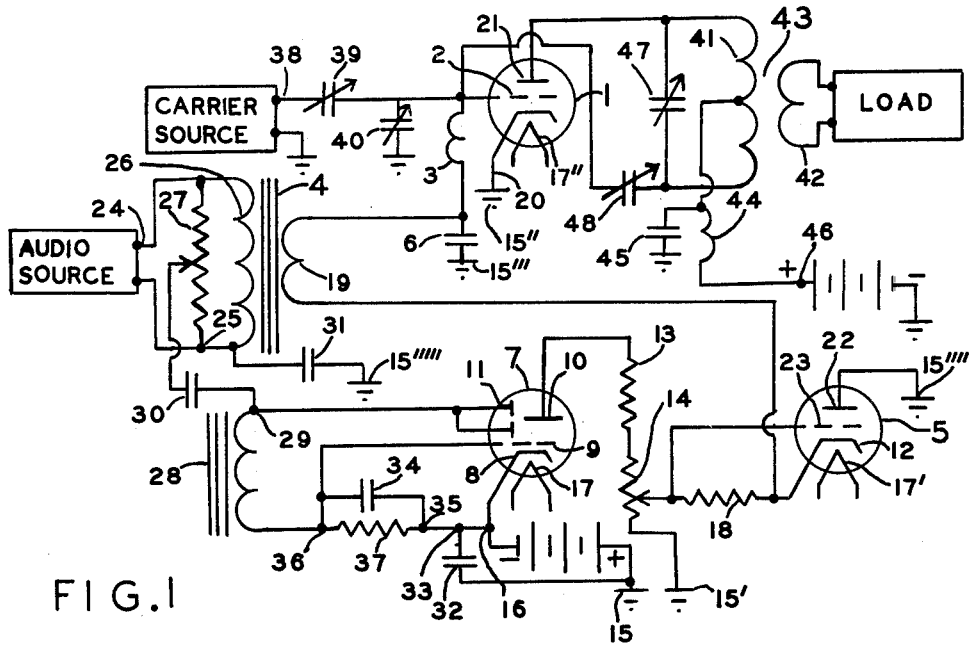
FIG. 1 is a schematic electrical diagram of one form of the apparatus of this invention.

The numeral 1 designates generally a triode type vacuum tube used as a class "C" modulated radio frequency amplifier. The tube 1 includes a control grid 2, plate 21, cathode 20, and filament 17″. As will be explained more fully hereinafter, the grid 2 is connected with radio frequency choke coil 3 and with a source of radio frequency or R.F. voltage 38 such as a suitable radio frequency oscillator or a radio frequency amplifier stage. Capacitors 39 and 40 are connected between the R.F. voltage source 38 to serve as a variable radio frequency voltage divider by which a desirable amount of radio frequency voltage can be applied to grid 2, as will be more evident hereinafter. The choke coil 3 is connected with a secondary winding 19 of transformer 4 and such winding 19 has an electrical connection with a cathode 12 of a bias regulator tube 5. A capacitor 6, connected to ground at 15″′, is also connected with the choke 3 and it serves to form a radio frequency filter for preventing radio frequency voltages from getting into the modulating transformer 4 and the bias regulator tube 5.

The bias regulator tube 5 includes, in addition to the cathode 12, a grid 23, a plate 22, and a filament 17′. The plate 22 is connected to ground at 15″″. The grid 23 is connected with a variable potentiometer 14. The cathode 12 is connected with a resistor 18 which also connects with potentiometer 14.

The numeral 7 designate generally a dual purpose type vacuum tube having a triode section consisting of cathode 8, control grid 9, and plate 10. It also includes a diode section using the common cathode 8 and two plates, externally connected together as shown at 11. A filament 17 is included in tube 7 in conjunction with the cathode 8, as explained hereinafter.

The triode section of tube 7 is utilized in a D.C. amplifier circuit, with plate resistor 13 and potentiometer 14 being functional parts thereof. The plate 10 is connected with the resistor 13 and the potentiometer 14. A voltage regulated bias voltage is applied between cathode 8 and ground 15 at connection point 16, from any sufficient type voltage regulated bias supply. Cathode 8 is connected to the negative terminal of the bias supply and ground 15 is connected to the positive terminal of the bias supply. A capacitor 32 is connected between the negative and positive terminals of the bias supply 16 for a purpose to be hereinafter explained. Also, a capacitor 34 and a resistor 37 are connected in parallel to the grid 9, and such capacitor 34 and resistor 37 are further connected at 36 to a reactor 28. The reactor 28 is connected at 29 to the two plates 11 of tube 7 and also to a capacitor 30.

As will be more fully explained, the capacitor 30 is connected to a movable contact of a potentiometer 27. The potentiometer 27 is connected in parallel with the primary winding 26 of the audio transformer 4, and one end of the potentiometer 27 is connected at 24 to the last audio amplifier tube of a speech amplifier of known construction (not shown). The other end of the potentiometer 27 is connected at 25 to the positive high voltage of the speech amplifier power supply (not shown). Also, a capacitor 31, which is grounded at 15''''', is connected to the same end of the potentiometer 27 to which the connection 25 is made.

Considering now the operation of the apparatus of FIG. 1 and the method wherein said apparatus may be utilized, when the filament 17, of tube 7, is heated to the proper temperature, as dictated by the design characteristics of the tube, by connection to a proper filament voltage supply; cathode 8 will be heated sufficiently to emit electrons, which will be attracted to plate 10, because of its positive charge, with respect to cathode 8, said positive charge being obtained by the plate being connected to ground at 15' through resistor 13, and potentiometer 14 and hence to the positive terminal of the bias supply.

With no bias voltage applied to control grid 9, of tube 7, the amount of plate current flowing through tube 7, from cathode 8, to plate 10, will be limited entirely by the total resistance of resistor 13 and potentiometer 14, in a direction toward and to ground 15', thus causing a voltage drop to appear across the total resistance of resistor 13 and potentiometer 14; resulting in the plate end of resistor 13 being negative with respect to ground 15' by an amount determined by the product of the current through resistor 13 and potentiometer 14, and the total resistance of resistor 13 and potentiometer 14. The actual amount of voltage then appearing between plate 10 and ground 15', must be dependent on the total series resistance of the internal plate resistance of tube 7, the resistance of resistor 13 and potentiometer 14, and the amount of voltage applied to terminal 16 from the bias voltage supply. Thus a voltage divider is formed by tube 7, resistor 13, and potentiometer 14 which exists across the bias supply voltage through connecting terminal 16.

By positioning the sliding contact of potentiometer 14; a proper amount of negative voltage, with respect to ground 15' may be applied through resistor 18 to cathode 12 of tube 5 and thence to grid 2 of tube 1, through the secondary winding 19 of modulation transformer 4, and R.F. choke 3; thereby causing grid 2 of tube 1 to be negative with respect to ground 15' by the aforementioned proper amount. The proper amounts will be given later in this specification.

Cathode 20 of tube 1 is connected to ground at 15''; therefore, grid 2 of tube 1 is negative with respect to cathode 20 of tube 1, by the proper amount as determined by the positioning of the sliding contact of potentiometer 14.

The proper amount of negative bias voltage developed as related above; and applied to grid 2 of tube 1 is dependent on the type tube and its grid voltage-plate current characteristic curve, and will be specified and pointed out later on another drawing. At this point in this specification, it will be sufficient to say that the amount of negative bias applied to grid 2, of tube 1, should be approximately twice the value of plate current cut off bias required for tube 1, with nominal positive plate voltage applied to plate 21 of tube 1.

Tube 5, with resistor 18, comprises a bias voltage regulator device which functions to stabilize the negative bias voltage applied to grid 2, of tube 1, if and when any current is drawn by grid 2, of tube 1, from cathode 20 of that same tube.

Plate 22 of tube 5 is connected directly to ground at 15''', which is the positive voltage of the bias supply. A negative voltage with respect to ground, and therefore, with respect to plate 22 of tube 5, its value being determined by the position of the movable contact of potentiometer 14, is applied to cathode 12 of tube 5, through resistor 18.

When the filament 17' of tube 5 is connected to a proper filament voltage supply, it will be heated to its normal temperature, causing cathode 12 of tube 5 to heat to sufficient temperature to emit electrons which will be attracted to positive plate 22. A plate current then flows through resistor 18 to cathode 12, to plate 22 and then to ground at 15''''. This current flow through resistor 18 causes a voltage drop across said resistor, causing the cathode end of it to be positive with respect to its other end. Grid 23 of tube 5 is connected directly to the negative end of resistor 18 causing said grid to be negative with respect to cathode 12, by the amount of voltage drop across resistor 18. The value of resistor 18 is such that if any measurable small amount of current flows through it, the voltage drop across this resistor will be of great enough amplitude to bias tube 5 to plate current cut off. This condition requires only a negligible amount of current from the D.C. amplifier composed of tube 7, resistor 13, and potentiometer 14. If any current drawn by grid 2 of tube 1 attempts to flow to cathode 20 of tube 1, it must necessarily follow a path through choke 3, transformer winding 19, resistor 18, potentiometer 14 to ground at 15', to cathode 20 of tube 1 from ground 15''. In following the above outlined path, this grid current flows through resistor 18 from the cathode and toward the end connected to potentiometer 14. This grid current flow through resistor 18 is in the opposite direction of the flow of tube 5 plate current through the resistor. This causes a reduction of the voltage drop across resistor 18, thereby reducing the grid bias of grid 23 of tube 5; allowing plate current to flow through tube 5 to ground 15''''. The internal plate resistance of tube 5 is very small compared to the resistance of resistor 18. This causes approximately all of the grid current then to be shunted to ground at 15'''' instead of through potentiometer 14 to ground at 15', thereby preventing grid current drawn by grid 2 of tube 1 from effecting the voltage drop of potentiometer 14. Thus the value of fixed bias applied to grid 2 of tube 1 remains constant.

For a definite reason which will be specified later in this specification, a means for rapidly shifting the D.C. bias voltage applied to grid 2 of tube 1 must be provided. The D.C. control bias of tube 1 must shift in value simultaneously with variations of the audio modulating voltage applied to control grid 2 of tube 1 when the control grid is modulated by modulating transformer 4. The required bias shift is obtained in the following manner:

When the primary winding 26 is connected to an appropriate speech amplifier with one end of the winding shown at 24, connected to the plate of the last amplifier tube of the speech amplifier, and the other end of the primary winding of the modulation transformer shown at 25 is connected to the positive high voltage of the speech amplifier power supply, the output audio voltage of the speech amplifier will be applied across the primary winding 26 of transformer 4.

Potentiometer 27, having a resistance value great enough not to adversely affect the impedance of winding 26 is placed across the terminals of winding 26. The output audio voltage from the aforementioned speech amplifier exists across potentiometer 27.

Any appropriate portion of the total audio voltage existing across potentiometer 27, determined by the position of the movable contact of potentiometer 27, can be applied to plates 11 of tube 7 and one end of the winding of the audio reactor 28 connected to plates 11 of tube 7 shown at 29.

The voltage drop existing across potentiometer 27, when modulation voltage is applied thereto from the speech amplifier, is a D.C. voltage, the amplitude of which varies in direct accordance with the audio voltage applied to potentiometer 27 from the speech amplifier.

Regardless of the amplitude of voltage drop across potentiometer 27, the plate current from the speech amplifier tube to which 24 is connected, flows through potentiometer 27 in a direction from connection 24 through potentiometer 27 to connection 25 and to the speech amplifier high voltage power supply. As a result of current flow through potentiometer 27, and because current flow is always in the above mentioned direction through potentiometer 27, the end of potentiometer 27 connected to 25 is always positive with respect to the other end which is connected to 24, regardless of the amplitude of the current flow through potentiometer 27.

Capacitor 30 with one of its plates connected to the movable contact of potentiometer 27 and its other plate connected to 29 will take a voltage charge equal to the amount of voltage drop existing between the movable contact of potentiometer 27 and the end of the potentiometer connected to 25 at any instant. The plate of capacitor 30, connected to the movable contact of potentiometer 27, will always be negative with respect to its other plate connected to 29, and by the amount of voltage drop existing across that portion of potentiometer 27 between its movable contact and the end connected to 25.

During the time that the voltage drop across potentiometer 27 is increasing in accordance with the audio voltage, from the speech amplifier as explained above, the voltage charge of capacitor 30 is increasing. During the time that the voltage charge of capacitor 30 is increasing, electrons are leaving the plate of the capacitor connected to 29. To affect an increase of voltage charge on capacitor 30, the number of electrons leaving one of its plates must be transferred to the opposite plate of the capacitor.

Because of the voltage drop existing across potentiometer 27, an excess number of electrons exist at the point of the movable contact of the potentiometer with respect to its end connected to 25. Electrons can be supplied from this point of the movable contact to the plate of capacitor 30 connected thereto. Electrons will then move out of the plate of capacitor 31 which is connected to the positive end of potentiometer 27 at 25. The same plate of capacitor 31 now has a lesser number of electrons than its other plate which is connected to ground at 15′′′′′. Because of this condition, a great attraction for electrons exists at the grounded plate of capacitor 31. Electrons move out of the plate of capacitor 32 which is grounded at 15 and the common ground path into the grounded plate of capacitor 31. Electrons now move into the plate of capacitor 32 connected to point 33, out of the plate of capacitor 34 connected to point 35. Electrons cannot move to cathode 8 of tube 7 through the tube from plates 11. The needed electrons are supplied to the plate of capacitor 34 connected to point 36 from the plate of capacitor 30 connected to point 29, through the winding of reactor 28. Electrons also leave plates 11 of tube 7 to join those from capacitor 30 at point 29 to supply needed electrons to the plate of capacitor 34 connected to point 36. Now that plates 11 have given up some electrons, the plates can attract electrons inside tube 7 that have been emitted by cathode 8. Plates 11 are now positive with respect to cathode 8. Electrons attracted to plates 11 inside tube 7 help to supply needed electrons to capacitor 34 through reactor 28. There is more than enough available for this purpose; and a considerable number of electrons return to cathode 8 of tube 7 externally through resistor 37 in a direction from connection 36 to cathode 8, causing a voltage drop to exist across resistor 37. To restore electrons emitted from cathode 8, the plate of capacitor 34 connected to point 35 gives up an additional number of electrons. This causes more electrons to enter the other plate of capacitor 34 connected to point 36, thereby causing an unusually heavy charging of capacitor 34. The direction of the electron flow through resistor 37 is from connection 36 to cathode 8, causing connection 36 to be negative with respect to cathode 8.

Grid 9 of tube 7, because of its direct connection to point 36, then becomes negative with respect to cathode 8 by the amount of the voltage drop across resistor 37. This decreases the plate current of the triode section of tube 7. Because of the decrease of this plate current through resistor 13 and potentiometer 14, the voltage drop across potentiometer 14 decreases in value and thereby decreases the control grid bias applied therefrom to grid 2 of tube 1, through resistor 18, winding 19 and R.F. choke 3.

A decrease of control bias to grid 2 of tube 1 has thus been obtained from an increase of audio voltage drop across potentiometer 27. This causes a current to follow in a complete circuit from the movable contact of potentiometer 27 through capacitor 30 to connection point 29, then through the winding of reactor 28 to 36 through capacitor 34 to point 35, and to point 33 through capacitor 32 to ground at 15, through the common ground to 15′′′′′. It then flows through capacitor 31 to the opposite end of potentiometer 27 connected at point 25.

The flow of current through this path causes plates 11 of tube 7 to become positive with respect to cathode 8 of tube 7, which caused a current flow through a circuit from cathode 8 of tube 7 internally to plates 11 to connection 29 through the winding of reactor 28 to point 36 through resistor 37 and returning to cathode 8.

When a decrease of the audio voltage drop occurs across potentiometer 27, a discharge of capacitor 30 occurs. The function and direction of the electron flow is exactly reversed to that related to the charging of capacitor 30. During the discharging of capacitor 30, electrons flowing into plates 11 of tube 7 causes the plates to be negative with respect to cathode 8 and no current flows internally in tube 7 to cathode 8.

Due to the aforementioned unusually heavy charge taken by capacitor 34, and because none of the electron flow during the discharge of capacitor 30 can return through tube 7, all of the electrons, to discharge capacitor 30, is taken from the plate of capacitor 34 connected to point 36 through reactor 28 to the plate of capacitor 30 connected to point 29.

After capacitor 30 is completely discharged, a considerable charge is left on capacitor 34. Only resistor 37 can now discharge the remaining charge of capacitor 34. During this discharge, electrons leave the plate of capacitor 34 connected to point 36 through resistor 37 to the other plate of capacitor 34 connected at point 35. This electron flow through resistor 37 is in the same direction as the current flow caused by the charging of capacitor 34.

The negative voltage to grid 9 of tube 7 is retained for a period of time, determined by the capacity of capacitor 34 and the resistance of resistor 37 after capacitor 30 is completely discharged.

If capacitor 30 is charged and discharged at a more rapid rate than the discharge time of capacitor 34 through resistor 37, the D.C. bias voltage for grid 9 of tube 7 developed across resistor 37 will remain constant in amplitude, with a given peak audio voltage developed across potentiometer 27. A filtered D.C. bias that changes in value only in accordance with a change of the audio peak voltage is in this manner developed. The change in value of the D.C. bias so developed is directly proportional to the audio peak voltage.

Reactor 28, due to its impedance at audio frequencies, limits the charging rate of capacitor 34 during the first positive half cycle of audio modulating voltage. This causes the D.C. bias voltage developed across resistor 37 to progress in amplitude in direct proportion to the sine wave shape of the audio modulating voltage. The importance of this feature will be pointed out later in this specification.

As stated previously, the function of tube 1 is that of a class "C" radio frequency amplifier which can be modulated by variations of the negative grid bias in accordance with the audio modulating voltage.

When filament 17″ is connected to a suitable filament voltage supply, filament 17″ will be heated to the proper temperature and will heat cathode 20 of tube 1 sufficiently to cause the cathode 20 to emit electrons.

Plate 21 of tube 1 is connected to a positive high voltage through the primary winding 41 of radio frequency transformer 43, through the R.F. choke 44 by connection 46 of a suitable high voltage power supply.

Winding 41 and capacitor 47 form a parallel resonant circuit resonated to the frequency applied to the control grid 2 of tube 1. Capacitor 48 is a conventional neutralizing capacitor. Choke 44 with capacitor 45 is an R.F. filter for preventing radio frequency voltages from entering the positive high voltage power supply. Winding 42 is a link coil for extracting radio frequency power from the tank circuit which is made up by winding 41 and capacitor 47.

The radio frequency power extracted by link coil 42 may be applied to an antenna or to a linear R.F. amplifier for further amplification before feeding it to an antenna.

Figure 2:
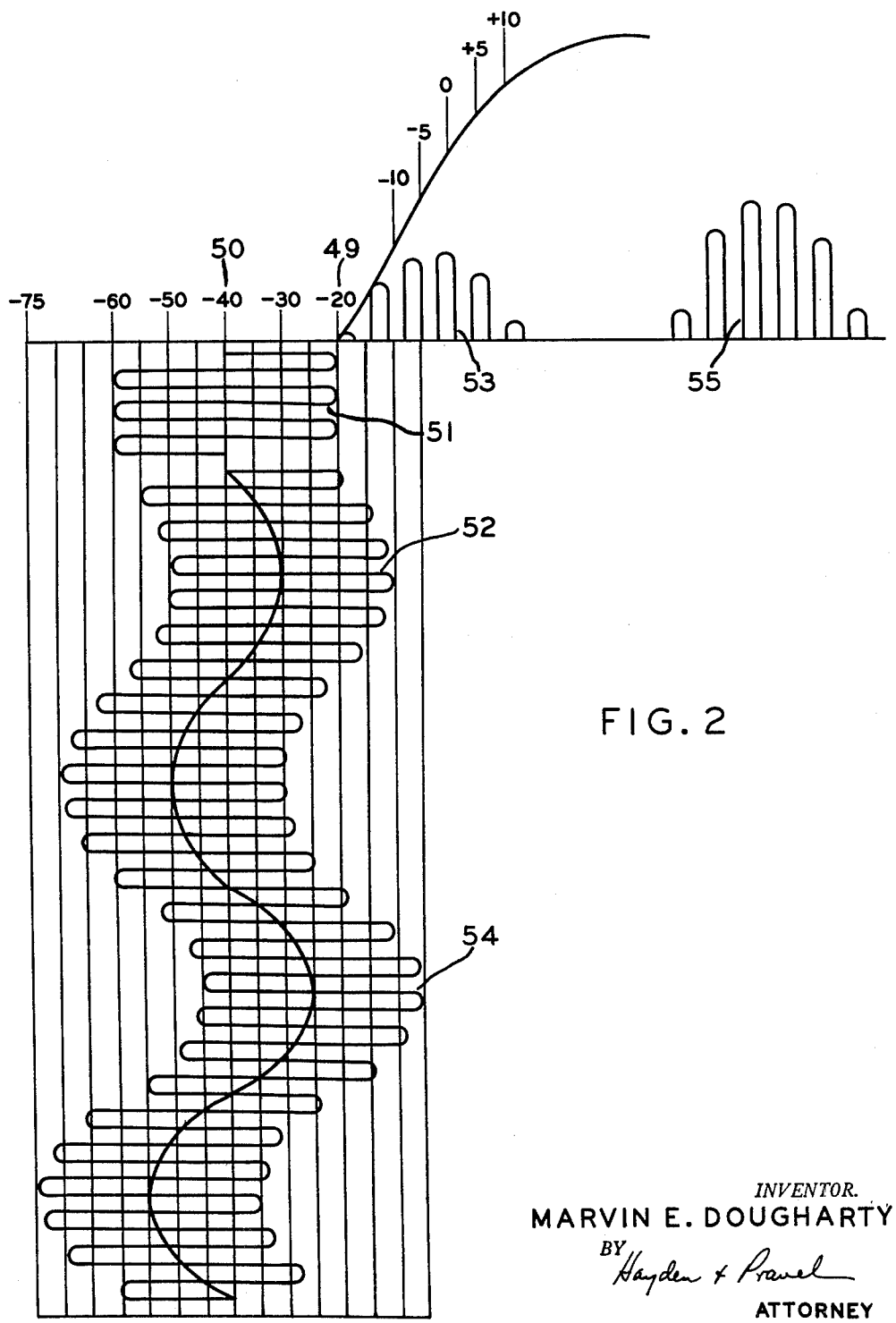
FIG. 2 shows a typical grid-voltage plate-current characteristic curve of the triode vacuum tube of FIG. 1.

Referring now to FIG. 2, the numeral 49 refers to the portion of the curve which shows that with a certain positive voltage applied to plate 21 of tube 1 of FIG. 1; and a negative 20 volts of bias is applied to grid 2 of tube 1 of FIG. 1, no plate current will flow through the tube.

Now if a negative fixed bias of 40 volts, shown at 50 of FIG. 2, is applied to the control grid 2 of the tube 1 from potentiometer 14 (FIG. 1), an R.F. excitation of 20 peak volts may also be applied to the control grid without causing any plate current to flow through the tube. This R.F. voltage adjustment is made by varying the capacity of capacitor 40 of FIG. 1. The resulting negative bias now varies at the radio frequency rate of the excitation voltage applied between negative 20 volts and negative 60 volts without causing any plate current to flow in the tube. This bias voltage variation is shown at 51 in FIG. 2 for three cycles of the R.F. excitation voltage.

If any amount of audio modulating voltage is now applied to the control grid of the tube from modulation transformer 4 of FIG. 1 by way of its secondary winding 19, modulating voltage will subtract from the negative bias during its positive half cycle and add to the negative bias during its negative half cycle, by the amount of its instantaneous voltage. During the complete positive half cycle of the modulating voltage, the resulting negative bias to the control grid of the tube will be less than the plate current cut off bias by the amount of the instantaneous modulating audio voltage. During the entire negative half cycle of audio modulating voltage, the resulting negative grid bias will be greater than the plate current cut off bias. No plate current flows in the tube. Plate current through the tube under these conditions will be at the radio carrier frequency. Plate current will flow only during part of the positive half cycle of the R.F. excitation voltage.

The portion of the positive half cycle of R.F. excitation during which plate current flows in the tube, is dependent on the instantaneous positive peak audio voltage applied to the negative grid bias.

The numeral 52 of FIG. 2 shows the resulting grid bias variation when an audio voltage, having a peak value of 10 volts, and an R.F. excitation voltage having a peak value of 20 volts, is applied simultaneously to the negative grid bias.

The numeral 53 of FIG. 2 shows the resulting plate current flow of the tube under these conditions. The envelope peak amplitudes of the R.F. plate currents will always conform to the wave shape of the audio modulating voltage. The plate current shown at 53 results from the condition shown at 52.

The numeral 54 of FIG. 2 shows the negative grid bias variation when an audio voltage, having a peak value of 15 volts, is applied simultaneously with an R.F. excitation voltage having a peak value of 20 volts to the negative grid bias. The resulting plate current under this condition is shown at 55 of FIG. 2.

It is obvious at this point that conventional amplitude modulation is obtained only during the positive half cycle of the audio modulating voltage, and that the carrier is completely suppressed when no modulating voltage exists.

In order that the negative half cycle of audio modulating voltage be transmitted, a value of operating grid bias must be established which is less than the plate current cut-off bias, by an amount equal to or greater than, the peak audio modulating voltage. This prevents the negative grid bias from exceeding the plate current cut-off value during the entire negative half cycle of audio modulating voltage. To establish this operating bias during the time modulating voltage exists and to completely suppress the carrier during the time when no modulating voltage exists, the negative grid bias must be shifted from one value during no modulation to some proper lesser value during modulation. Reference number 56 of FIG. 3 again shows the original fixed negative bias without R.F. excitation and audio modulating voltages applied thereto. 58 of FIG. 3 also again shows the negative bias variation with only R.F. excitation applied.

Now if the proper amount of audio voltage is applied to connection 29, FIG. 1, by capacitor 30 of FIG. 1 as described before in this specification, a decrease in the negative fixed bias developed across potentiometer 14 of FIG. 1 is developed. If the amount of bias decrease obtained in this manner is equal to the peak audio voltage, then the fixed bias will shift to the proper operating bias as mentioned above.

Figure 3:
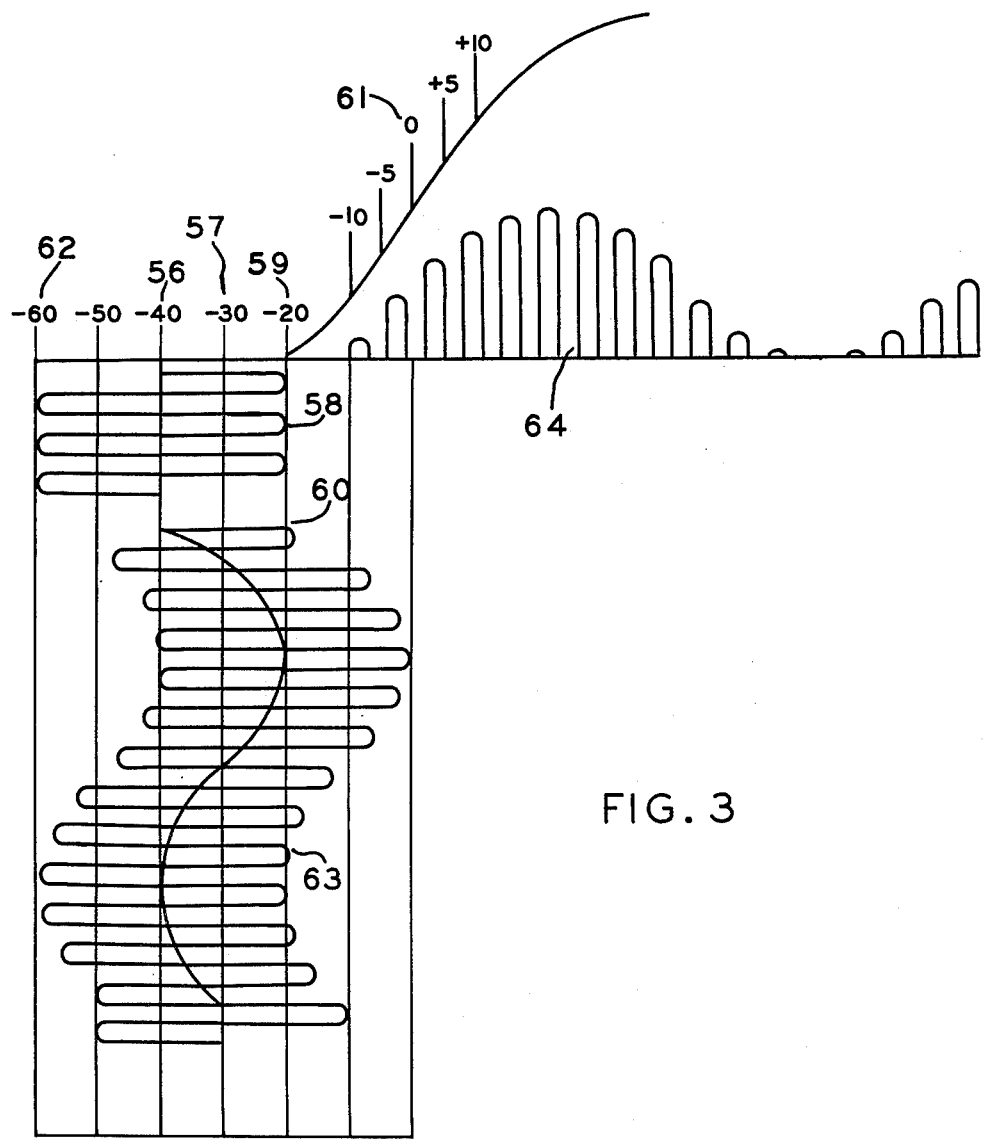
FIG. 3 shows a grid-voltage plate-current characteristic curve to illustrate the effect of the audio modulation using the apparatus and method of this invention.

Reference numeral 60 of FIG. 3 shows the effect of the R.F. excitation of 20 peak volts, the audio modulating voltage of 10 peak volts, and a 10 volt D.C. decrease of the fixed bias acting simultaneously on the fixed bias of negative 40 volts.

One cycle of audio modulating voltage is shown. At the beginning of the first audio voltage cycle, a positive voltage is applied to plates 11 of tube 7 in FIG. 1 from capacitor 30 of FIG. 1. This positive voltage increases in a direct ratio to the audio modulating voltage amplitude. This causes the plate current in tube 7 of FIG. 1 to flow through reactor 28 and resistor 37 causing the negative bias to grid 9 to increase in a direct ratio with the audio voltage amplitude. Therefore the voltage drop across potentiometer 14 of FIG. 1 decreases in a direct ratio to the audio modulating voltage. If the audio voltage continues for any number of cycles with no change in its peak amplitude, the voltage drop across resistor 37 in FIG. 1 will be filtered by capacitor 34 of FIG. 1. A D.C. voltage, the amplitude of which is an average value of the audio peak voltage applied to plates 11 of tube 7 in FIG. 1, will be developed across resistor 37. Hereafter, if the peak value of the audio voltage increases or decreases, the D.C. voltage drop across resistor 37, FIG. 1, and applied to grid 9 of tube 7, FIG. 1, increases or decreases likewise. If the audio modulating voltage is removed entirely, then the voltage drop across resistor 37 in FIG. 1 will be removed causing the negative bias to return to its original plate current cut-off value, and the carrier will then again be completely suppressed. The values of resistor 37 and capacitor 34 of FIG. 1 should be chosen that will provide adequate filtering of the rectified audio voltage drop across resistor 37, and at the same time have a short discharge time for capacitor 34 through resistor 37, after modulating voltage has been removed from plates 11 of tube 7 in FIG. 1. This condition allows complete carrier suppression between syllables of speech modulation. This feature facilitates "break-in" voice communication when desired.

Reference numeral 60 in FIG. 3 shows that during the first cycle of modulating voltage having a peak value of 10 volts applied to a fixed negative bias of 40 volts, shown at 56 in FIG. 3, shifts the fixed bias to a negative 30 volts, as shown at 57 in FIG. 3. The operating bias then varies between negative 20 volts shown at 59, FIG. 3, and negative 40 volts, shown at 56 in FIG. 3. Now with an excitation voltage having a peak value of 20 volts applied simultaneously to the fixed grid bias, the resulting variation of the grid bias is between zero bias voltage, reference 61 of FIG. 3, and negative 60 volts shown at 62 in FIG. 3.

Under these conditions the positive half cycle of the R.F. excitation voltage causes plate current to flow in tube 1, FIG. 1, during the entire audio voltage cycle with the said plate current decreasing to the cut-off value at the very peak of the negative half cycle of the audio voltage, as shown at 63 in FIG. 3. The numeral 64 in FIG. 3 shows that the envelope of the plate current amplitudes conform to the audio wave shape, and therefore the carrier is satisfactorily modulated 100%.

Now, for any peak voltage value of the audio modulating voltage, tube 7 of FIG. 1 will develop a D.C. voltage across potentiometer 14 of FIG. 1 which is equal in amplitude to the peak voltage of the audio modulating voltage. Thus the operating grid bias is inversely proportional to the audio modulating peak voltage. For any value of modulating voltage therefore, the 100% degree of modulation is maintained.

When the plate currents, as shown at 64 in FIG. 3, of tube 1 of FIG. 1, is applied to the resonant tank circuit composed of coil 41 and capacitor 47 of FIG. 1, the output voltage induced in link 42 of FIG. 1 will be complete sine wave cycles at the same frequency of the R.F. excitation voltage. The envelope amplitudes of this R.F. voltage of course conform to the audio modulating voltage wave shape.

Figure 4:
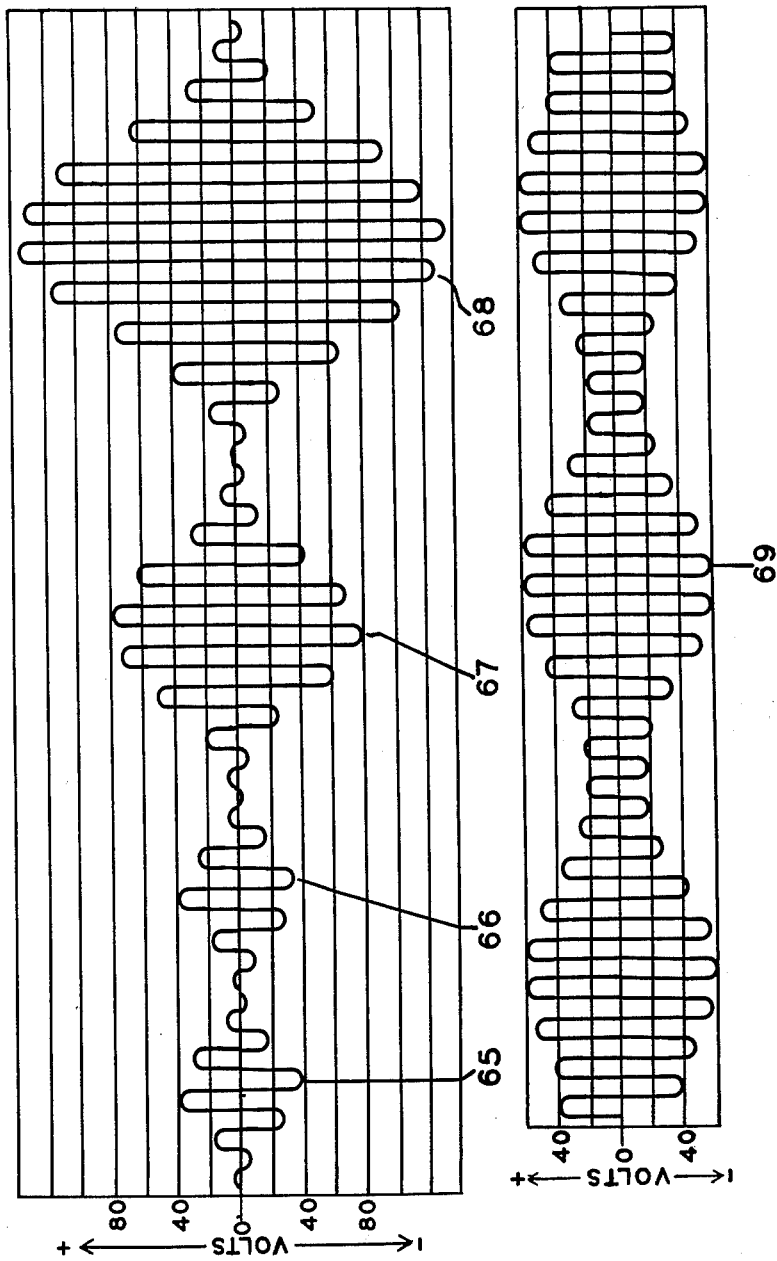
FIG. 4 illustrates the radiated signal obtained when using the apparatus and process of this invention as compared with the signal obtained with conventional amplitude modulated transmitters.

The numerals 65, 66, 67, and 68 of FIG. 4 represent the R.F. power output from the radio transmitter during 3½ cycles of modulation. The numerals 65 and 66 shows two cycles of modulation obtained by a relatively small value of modulating voltage resulting in a peak R.F. voltage output of 40 volts. The numeral 67 shows the results of doubling the initial modulating voltage amplitude for one cycle and reference 68 shows the results for increasing the amplitude of the modulating voltage 3½ times the original value shown at 65. This shows that the degree of modulation is 100% for any value of modulation voltage.

Because of the 100% degree of modulation at all modulating voltage values, as shown at 65, 66, 67, and 68 in FIG. 4, all of the R.F. carrier power output from the transmitter is utilized in conveying the desired audio intelligence.

For the purpose of comparison, the numeral 69 of FIG. 4 shows an output voltage of a conventional amplitude modulated transmitter. As indicated, the carrier has a peak voltage of 40 volts. A condition of 50% modulation is shown. The peak carrier varies between 20 volts and 60 volts, resulting in a peak envelope variation of 40 volts. Under these conditions a peak carrier of 60 volts is needed to convey 40 volts of audio voltage. The numerals 65 and 66 show that a peak carrier voltage of 40 volts conveys 40 volts of audio. Only during the condition of 100% modulation of conventional amplitude modulation, does the ratio of total power output to that amount actually used to convey the desired audio intelligence equal that of the system described in this specification.

Figure 1A:
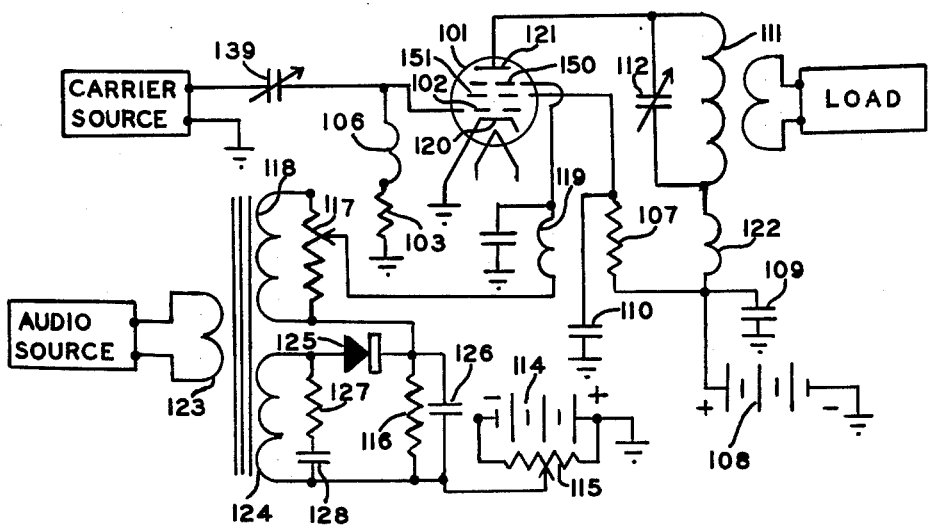
FIG. 1A is a schematic electrical diagram of another form of the apparatus of this invention.

In order to illustrate that the invention hereof, and particularly the method of this invention, is not limited to the form of the invention illustrated in FIG. 1 wherein the audio modulation is applied to the control grid, another embodiment of the invention is illustrated in FIG. 1A, wherein audio modulation is applied to a suppressor grid 150 of a pentode vacuum tube 101. The tube 101 has a cathode 120 which is connected to ground potential in the usual manner, and the carrier wave voltage is applied from any convenient source, as indicated in FIG. 1A, through a capacitor 139 to a control grid 102 of the tube 101. The control grid 102 is biased for class "C" operation, with the operating bias for said control grid 102 being derived from grid current through resistor 103 in series with radio frequency choke 106 to ground, as a consequence of carrier wave voltage applied to the control grid through the capacitor 139, to provide grid leak bias in a well-known manner. The tube 101 has a screen grid 151 which is connected to a battery or potential source 108 through a resistor 107 which serves to drop the voltage from the source 108 in order to apply a proper screen potential to the screen grid 151. A capacitor 110 is connected between the screen grid 151 and the resistor 107 to serve as a radio frequency bypass for the screen grid 151.

A series resonant circuit is provided by an inductor 111 which is shunted by a capacitor 112, and such circuit is resonant to the carrier wave frequency and receives the carrier currents of the plate 121 of the tube 101. The operating potential for plate 121 is provided by the voltage source 108, and is applied to the plate 121 through a radio frequency choke 122 in series with the inductor 111. A capacitor 109 provides a radio frequency bypass to the voltage source 108.

Another voltage source 114 provides a negative D.C. potential of a magnitude sufficient to bias the tube 101 to cut off the plate current on plate 121 when such potential is applied to the suppressor grid 150 and when normal excitation carrier voltage is applied to the control grid 102. The source 114 is connected to the grid 150 through resistors 116 and 117 which are connected in shunt with a transformer winding 118 which is connected in series with a radio frequency choke 119. A potentiometer 115 is included in the circuit for adjusting the negative D.C. bias applied to suppressor grid 150 to facilitate the suppression of the carrier voltage when no audio modulation exists. When modulating potentials are applied from any convenient audio source, as indicated in FIG. 1A, to a transformer winding 123, separate and equal modulating potentials are induced in secondary windings 118 and 124. The modulating potentials of the winding 124 are rectified by a rectifier 125, resulting in a direct current potential across the resistor 116 which is filtered by a capacitor 126. The discharge time constant of the capacitor 126 is made as short as possible while still maintaining sufficient filtering of the potentials developed across the resistor 116. A resistor 127 is connected in series with a capacitor 128 to shunt the winding 124 which causes attenuation of the higher frequencies of the modulating potentials applied to the rectifier 125, to facilitate a D.C. potential of constant amplitude throughout the audio frequency range of modulating potentials of constant amplitude.

The alternating current potentials of the winding 118 exist across the potentiometer 117 and are in series with the D.C. potential across the resistor 116. The potentiometer 117 is used to adjust the A.C. modulating potentials in series with the D.C. potential so that the peak amplitude of the A.C. potentials are at all times equal to the amplitude of the D.C. potential developed across the resistor 116. A unidirectional modulating potential is thus obtained and is applied in series with the suppressor grid negative bias to always affect a reduction and never an increase to the negative suppressor grid bias, during the time that modulating potentials exist. The carrier voltage from the carrier source is therefore suppressed during the absence of modulation and when modulation is applied, the output wave is one of constant degree 100% modulation, with the output power directly proportional to the amplitude of the modulating potentials, and with the amplitude of the carrier wave varying at the same frequency as the modulating potentials, as illustrated by numerals 65, 66, 67 and 68 of FIG. 4.

Figure 5:
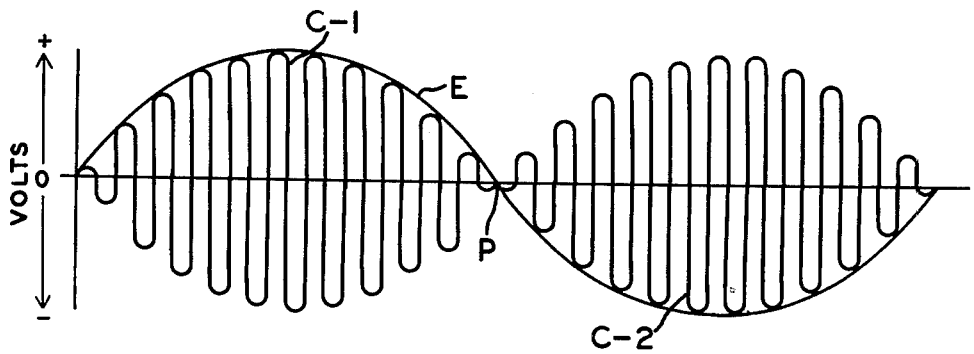
FIG. 5 is a graphic illustration of the output wave form of a conventional suppressed carrier balanced modulator system.
Figure 6:
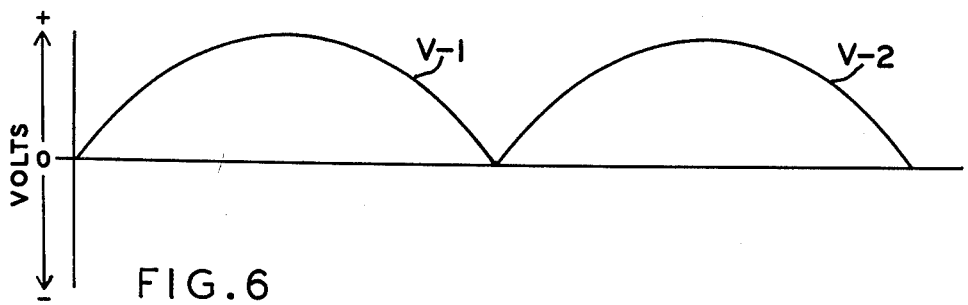
FIG. 6 is a graphic illustration of the direct current potential of an amplitude modulation detector as a result of detecting the wave shown in FIG. 5.
Figure 7:
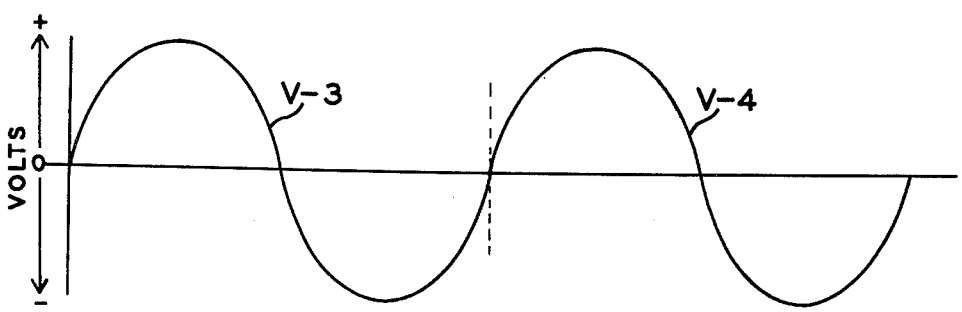
FIG. 7 is a graphic illustration of the alternating current voltage developed across the grid resistor of an audio amplifier when the voltage of FIG. 6 is applied to said grid resistor by means of a coupling capacitor.

By way of further illustration of types of apparatus which may be used in carrying out the method of this invention, reference is now made to the embodiments shown in FIGS. 9–12. To facilitate understanding of such embodiments and the advance thereof over the prior art, several graphs shown in FIGS. 5, 6, 7, 8, 13 and 14 are included. In FIG. 5, a typical carrier wave envelope E in sine wave form as produced from conventional suppressed carrier balanced modulator systems, when unbalanced by an audio modulating potential, is shown. The carrier wave shown therein is actually in two parts C–1 and C–2 with a phase change of 180° indicated at P. Thus, although the conventional suppressed carrier balanced modulator systems have the desirable feature of utilizing power only during the time that modulation occurs, such systems have the disadvantage of creating two outputs of carrier wave for each cycle of modulating potential which results in the type of signal shown at FIG. 6 being detected at a receiver by any of the known types of amplitude detectors. Thus, voltage V–1 results from the detection of the carrier wave C–2, in FIG. 5 and voltage V–2 results from the detection of the carrier wave C–3 of FIG. 5. Because the voltages V–1 and V–2 are unidirectional, and because they vary from zero to a peak value of amplitude and then decrease to complete zero, if they be applied to any inductive or capacitive coupling device or to any form of audio reproducer, each voltage V–1 and V–2 will convert to one complete cycle of A.C. voltage. Since voltage V–1 results in one cycle of A.C. voltage as shown at V–3 in FIG. 7, and voltage V–2 results in one cycle of A.C. voltage as shown at V–4 in FIG. 7, then the end result of detecting the signal of FIG. 5 is two complete cycles of modulating potential received when only one cycle of modulating potential was transmitted. Therefore, all modulating frequencies making up speech or music are multiplied by a factor of two which would render reception unintelligible.

Figure 8:
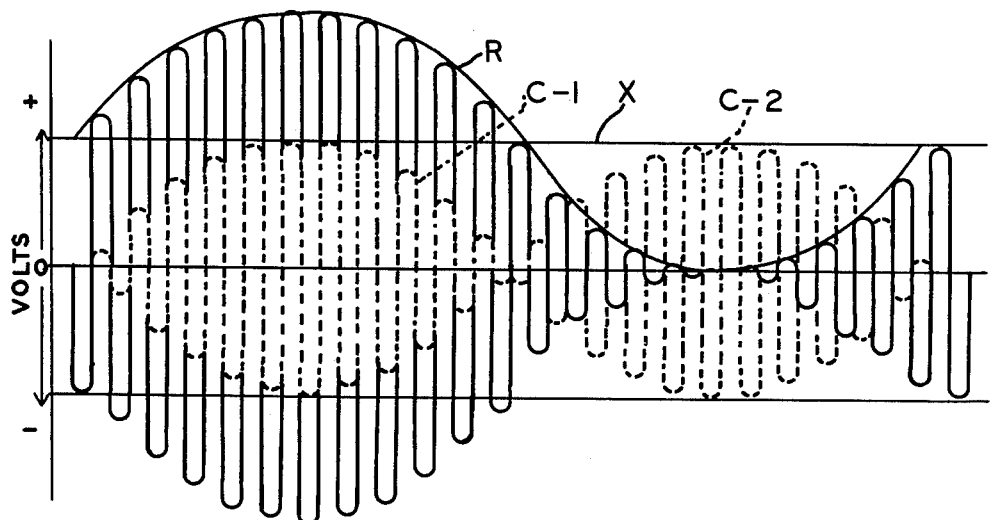
FIG. 8 is a graphic illustration of the conventional process for converting the wave of FIG. 5 by reinsertion of the carrier frequency at the radio receiver.
Figure 14:
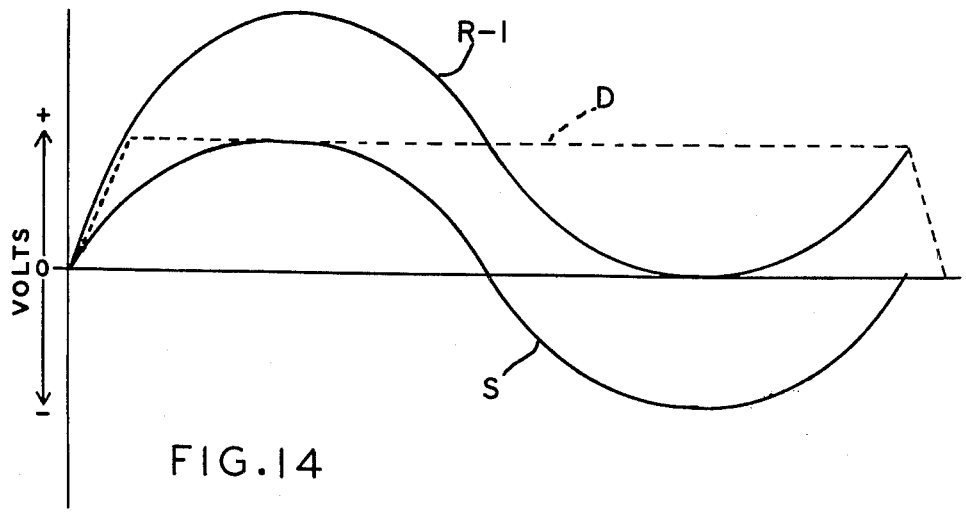
FIG. 14 is a graphic illustration showing the wave form of the modulating potentials impressed upon the balanced modulator arrangements shown in FIGS. 11 and 12.

In order to obtain an intelligible signal, a special detector or receiver has been necessary to detect the type of signal shown in FIG. 5. The graph resulting from the use of the special detector is illustrated in FIG. 8, wherein the carrier waves C–1 and C–2 of FIG. 5 are shown in dotted lines. When a carrier voltage having exactly the same frequency as the carrier waves C–1 and C–2 is supplied within the receiver and is thereby mixed with, added to, impressed upon, or "re-inserted" to, carrier waves C–1 and C–2, and the "re-inserted" carrier is also exactly phased with either carrier waves C–1 or C–2 and the "re-inserted" carrier has an amplitude equal to the peak amplitude of carrier waves C–1 and C–2 as indicated by line X of FIG. 8, then carrier waves C–1 and C–2 are converted to the resultant wave having an envelope as indicated by R.

With the apparatus and method of this invention, and particularly the forms of the invention shown in FIGS. 9–12, the necessity for the special detector or receiver is eliminated along with the known inherent disadvantages of such special equipment. Referring now to the form shown in FIG. 9, the numerals 215 and 216 indicate control grids of tubes 210 and 211, respectively, of a first balanced modulator generally designated by the letter M–1, and 217 and 218 indicate the control grids of tubes 212 and 213 of a second balaned modulator M–2.

Figure 9:
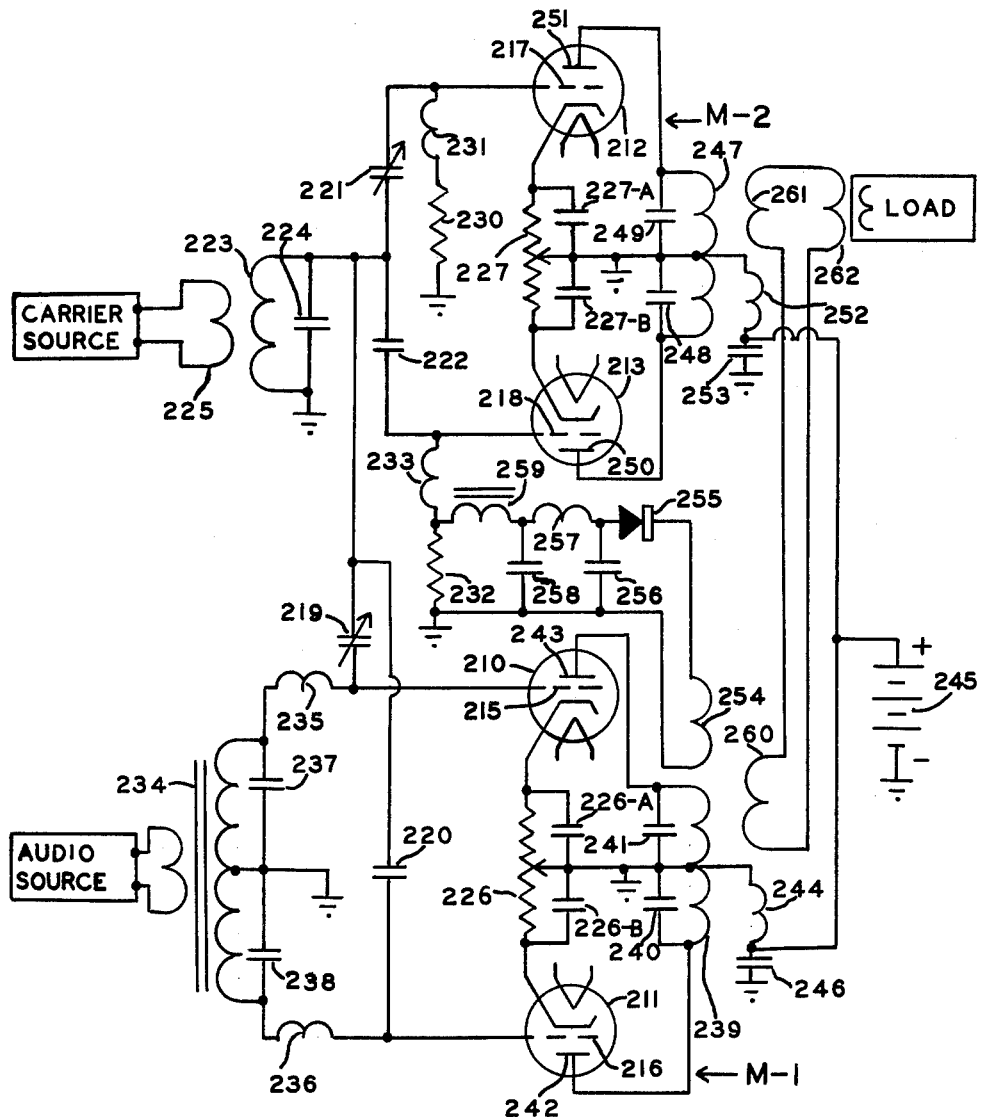

Carrier wave voltage is applied to the grids 215 and 216 by means of coupling capacitors 219 and 220 respectively, and to the grids 217 and 218 by means of capacitors 221 and 222, respectively, from the resonant tank comprising inductor 223 in series with capacitor 224, said tank being resonant to the carrier wave frequency, said carrier wave being supplied from any convenient carrier source as indicated in FIG. 9 which is connected with an inductive coupling between the inductor 223 and a coupling link 225.

The capacity of capacitor 219 is made variable over a range extending from a value greater than to a value less than that of the fixed capacitor 220, to provide a carrier balance control in a well known manner; the capacitor 221 is made similarly variable with respect to the fixed capacitor 222.

A variable resistor 226 is connected to the tubes 210 and 211 to provide cathode resistance to ground for thereby controlling the grid bias in a well known manner for the balanced modulator M–1. Likewise, the resistor 227 is connected to the tubes 212 and 213 for the same purpose. Capacitors 226a and 226b are connected in series with each other and in parallel with the resistance 226 to filter the potential across the resistor 226 to apply a smooth bias voltage to the grid 215 by way of one half of the secondary winding of a modulating transformer 234 in series with a radio frequency choke 235, and to the grid 216 by way of the other half of the secondary winding of the transformer 234 in series with a radio frequency choke 236. Capacitors 237 and 238 provide a radio frequency by-pass to the secondary winding of transformer 234. Capacitors 227a and 227b are connected in series with each other and in parallel with the resistance 227 for filtering the potential across the resistor 227 to provide a smooth grid bias voltage to be applied to the grid 217 by way of a resistor 230 in series with a radio frequency choke 231, and also to grid 218 by way of a resistor 232, and radio frequency choke 233. The resistance value of the resistor 230 is equal to that of resistor 232, so that any potential developed due to contact current from the cathode to the grid of the two tubes 212 and 213 of the balanced modulator M–2, will be equal in amplitude, to prevent any undue unbalance to the plate currents of such tubes 212 and 213.

An inductor 239 is connected in series with capacitors 240 and 241 and together they comprise a tank resonant to the frequency of the carrier wave impressed on the grids 215 and 216. Such tank is connected to plates 242 and 243 of the tubes 210 and 211 of the first balanced modulator M–1 in push-pull by way of a radio frequency choke 244 from a center tap of the inductor 239 to the positive terminal of a battery 245, which supplies operating potential to the plates 242 and 243. A capacitor 246 provides a radio frequency by-pass to the battery 245. The elements 247, 248, 249, 250, 251, 252, and 253, correspond with the elements 239, 240, 241, 242 243, 244, and 246, respectively, to provide like function to the second balanced modulator M–2 and with its operating plate potential also being supplied by the battery 245.

An inductor 254 is coupled to the inductor 239, to induce a portion of the modulated output of the first balanced modulator M–1 into the inductor 254. The modulated carrier wave induced into the inductor 254 is then detected by a rectifier 255, is applied through a radio frequency filter comprised of a capacitor 256 and a radio frequency choke 257, and also an audio frequency filter comprised of a capacitor 258 and a reactor 259, and to the load resistor 232. In addition to filtering the D.C. pulses from rectifier 255, the filter is also designed to cause a gradual high frequency roll off to the audio frequency range, in a manner to cause the D.C. voltage drop across the resistor 232 to be directly proportional to the peak envelope value of the modulated output of the first balanced modulator, at any audio frequency at which said balanced modulator is being unbalanced. The D.C. voltage existing across the resistor 232 thus adds to the negative bias voltage of the grid 218 of the second balanced modulator M–2, and that causes the bias voltage of the grid 218 to be greater than that of the grid 217. This causes the second balanced modulator M–2 to become unbalanced and that causes the carrier wave impressed on the grids 217 and 218 to appear in the inductor 247.

The mutual coupling of the inductors 254 and 239 is such that the D.C. voltage developed across the resistor 232 will be of such amplitude to unbalance the second balanced modulator M–2 to the extent that the carrier wave appearing in its output has an amplitude which is exactly equal to the peak envelope amplitude of the modulated carrier wave output of the first balanced modulator M–1. It is evident at this point that this relation of the amplitudes of the two balanced modulators is maintained for any amplitude of the modulating potentials impressed on the grids 215 and 216 of the first balanced modulator M-1 by means of modulating transformer 234. Equal amounts of output from the two balanced modulators M-1 and M-2 are induced in link inductors 260, 261, and 262 in series, to combine in the manner illustrated in FIG. 8 of the drawings; however, it should be noted that such results are thus obtained with this invention at the transmitter so that the re-insertion of the carrier frequency at the receiver is eliminated along with the known disadvantages attendant therewith.

Figure 10:
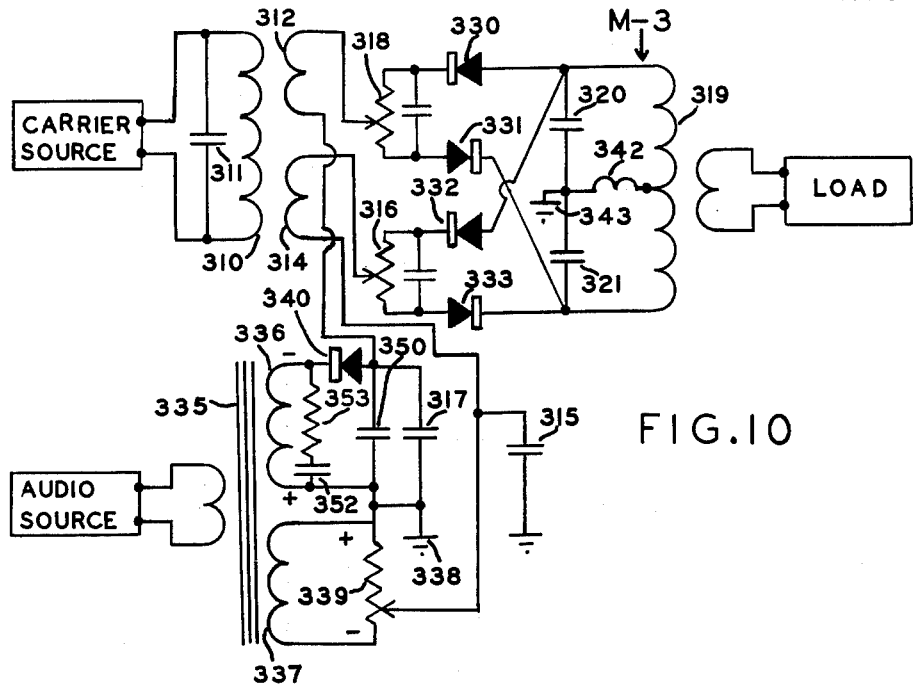
Figure 13:
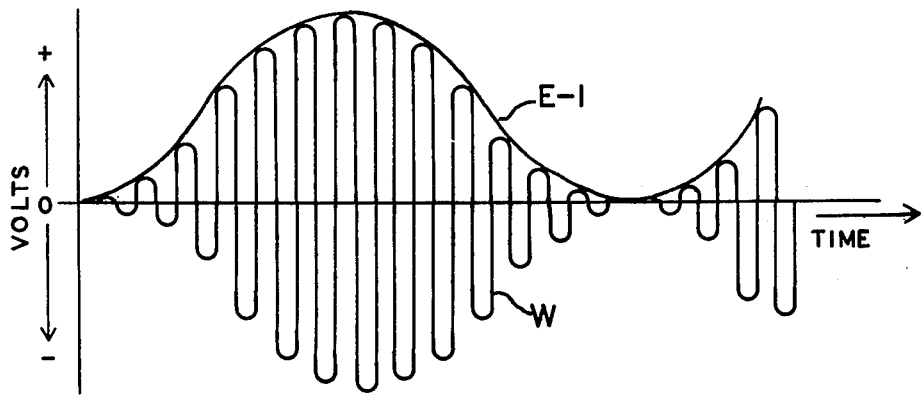
FIG. 13 is a graphic illustration of the wave form of the carrier wave output of the several embodiments of the invention.

Another form of the apparatus of this invention for carrying out the method of this invention is shown in FIG. 10, wherein a double balanced modulator similar to that of FIG. 9 is used, but with the thermionic triode devices of the FIG. 9 embodiment being replaced by semiconductor diode devices. In FIG. 10, an inductor 310 is shown connected in series with a capacitor 311 to form a resonant tank which is connected with any convenient carrier wave source as shown, such tank being resonant to the frequency of the carrier wave. Separate link inductors 312 and 314 are each of the same number of turns and such turns are inter-wound with each other and are inductively coupled to the inductor 310 to induce voltages and currents of the carrier wave in the links 312 and 314 of equal amplitude and in exact phase with each other. Such in-phase carrier voltages are applied to the two sections of a balanced modulator M-3, by applying the currents from the link 314 through a capacitor 315 and to a variable resistor 316, and by applying the currents from the link 312 through a capacitor 317 and to a variable resistor 318. An output tank comprised of an inductor 319 and capacitors 320 and 321 is connected to the variable resistors 316 and 318 for suppressing the carrier waves in the well known manner when the variable resistors 316 and 318 are properly adjusted. The resistor 318 has rectifiers 330 and 331 connected in series therewith and with the inductor 319. Also, rectifiers 332 and 333 are connected in series with the resistor 316 and the inductor 319, for a purpose to be hereinafter explained.

A transformer 335 is a modulating transformer having its primary winding connected to any convenient source of audio modulating potentials and its two secondary windings 336 and 337 with their polarities connected as shown in the drawing, with like polarity connected to ground at 338. Audio potential from the secondary winding 337 is applied across a variable resistor 339 having one terminal also connected to ground at 338. Audio potentials from the secondary winding 336 is rectified by a rectifier 340, connected in such polarity that causes a D.C. potential to be applied to the resistor 318 with a polarity which is negative with respect to the ground connection 338. When this negative potential appears at the resistor 318, a D.C. current is caused to flow through a portion of the resistor 318 in a direction toward and through a rectifier 330, then to and through one half of the inductor 319. A radio frequency choke 342 is connected at the mid-point of the inductor 319 and to a ground connection 343. The rectifier 331 prevents D.C. current from flowing in the opposite direction through the resistor 318 and the inductor 319.

The D.C. current just referred to, is filtered by a capacitor 350 which is connected in parallel with the secondary winding 336 so that the audio pulses from the transformer 335 are filtered out. A proper capacity value is chosen for the capacitor 350, which provides ample filtering and causes a discharge time delay through the resistor 318, in series with the rectifier 330, the inductor 319, and the radio frequency choke 342, to be as short as possible, consistent with ample filtering. A capacitor 352 is connected in series with a resistor 353 and both are connected in parallel with the secondary winding 336 so as to form an audio frequency filter which causes a gradual high frequency roll off to the audio modulating potentials. This provides a D.C. voltage of constant amplitude throughout the audio frequency range of modulating potentials of constant amplitudes.

At this point it is evident that the unbalancing effect of the D.C. voltage so applied at the resistor 318 causes the carrier wave from the link 312 to appear in the output of the balanced modulator M-3 and such carrier wave has no relative phase change occurring during any time that modulating potentials are applied from the transformer 335, but the amplitude of said carrier will be in direct proportion to the peak voltage of the modulating potentials. Thus a means of variable carrier injection is provided.

The A.C. modulating potentials across the resistor 339 are applied to the resistor 316 through the link 314 to cause modulating current to flow in a direction from the resistor 339 to and through the link 314, then through the upper portion of the resistor 316 toward and through the rectifier 332, and then through the inductor 319 and the radio frequency choke 342 to the ground at 343, during one half of a cycle of the modulating potential. This causes the carrier wave from the link 314 to appear in the output, which is in phase with the carrier wave appearing at that time from the link 312. During the second half cycle of the modulating potential, modulating current will flow from the ground at 343 through the radio frequency choke 342, through the lower half of the inductor 319 toward and through the rectifier 333, through the lower portion of the resistor 316 and through the link 314 to the resistor 339 to cause a 180° phase change in the carrier wave appearing at the output from the link 314. By adjusting the amplitude of the applied A.C. modulating potentials by means of the resistor 339, the carrier wave appearing in the output from the link 312 will have an amplitude equal to the peak envelope amplitude of the carrier wave appearing from the link 314 for any amplitude and frequency of the modulating potentials, whereby the curve of the output wave will appear as the wave R shown in FIG. 8.

In the form of the invention shown in FIG. 11, the inductor 410 is connected in parallel with a capacitor 411 and together they comprise a tank resonant to the carrier frequency of any convenient carrier wave source as shown in the drawing. The carrier wave is induced by inductive coupling from the inductor 410 into a link inductor 412 and is applied to a balance resistor 414 and to ground through the capacitor 415. By adjusting the resistor 414, the carrier wave is suppressed in a well known manner in an output tank comprised of an inductor 416 in parallel with capacitors 417 and 418 which is resonant to the carrier frequency applied to the balance resistor 414. Rectifiers 439 and 440 are connected in series and between the resistor 414 and the coil 416.

The primary winding of a modulating transformer 420 connects to any convenient source of modulating potentials, as shown. Two secondary windings 421 and 422 are provided to derive two separate modulating potentials which are combined in a novel arrangement to unbalance the suppressed carrier balanced modulator. The winding 422 provides approximately twice the modulating potential as provided by the winding 421. The winding 422 is center tapped and is grounded at 422a to facilitate full wave rectification of the modulating potential of this winding by means of the semiconductor type rectifiers 425 and 426, which are connected to the winding 422, as shown.

A capacitor 427 is connected in series with the rectifiers 425 and 426 and serves to filter the D.C. pulses from the rectifiers 425 and 426, and its discharge current is into a ground connection 428, to another ground connection 430, through a radio frequency choke 431, through half of the inductor 416 toward and through a rectifier 440, then through half of the balance resistor 414, to and through the link 412, and finally to and through a resistor 441 which is connected in shunt with the winding 421.

While such D.C. current passes through the part of its load resistance represented by the resistor 441 across the winding 421, the A.C. modulating potentials supplied by the winding 421 causes an A.C. current to add to the value of the D.C. current during one half of the A.C. cycle and to subtract from or oppose the D.C. current during the second half of the A.C. cycle.

Capacitors 450 and 451 are connected in parallel with the coil 422 to bypass the higher audio frequencies of the coil 422 to cause a gradual high frequency roll off to the audio frequency range, as will be well understood by those skilled in the art. The variable resistor 441 is adjusted so that the peak A.C. current through the resistor 441 is exactly equal to the D.C. current through the same resistor. As graphically shown in FIG. 14, this results in a uni-directional or D.C. voltage R-1, which has its amplitude variation conforming to the wave form of the modulation potentials and varying from exact zero to twice the peak amplitude of the modulating potentials. The D.C. voltage from the full wave rectifier during one cycle of sine wave modulating potential is shown in dotted lines in FIG. 14 and is designated by the letter D. One cycle of sine wave modulating potential S with a peak value equal to the value of the D.C. voltage D is also shown, and the resultant uni-directional voltage from combining the D.C. voltage D and the modulating potential S is shown by the curve R-1. Therefore, when the balanced modulator of FIG. 11 is unbalanced to conform to the voltage R-1 of FIG. 14, the carrier wave output of the balanced modulator will conform to the sine wave W illustrated in FIG. 13 and the carrier wave envelope E-1 during one cycle of sine wave modulation will appear as illustrated therein.

In the form of the invention shown in FIG. 12, a suppressed carrier balanced modulator using two triode tubes is incorporated. The carrier wave from the carrier source shown is applied in phase and of equal amplitude to control grids 510 and 511 which are connected to such carrier source through capacitors 512 and 514. The capacity of the capacitor 512 is variable over a range extending from a value less than to a value greater than that of the capacitor 514 to provide a means of carrier balance, as is well known. The triode tubes use cathode resistor bias to bias the grids 510 and 511 for Class A amplifier operation, as will be understood by those skilled in the art. A resistor 515 is connected in parallel with a capacitor 516, and both are grounded at 517, and they are connected in series with a rectifier 526, as shown in FIG. 12. The rectifier 526 is in turn connected in series with a coil or inductor 522 and another rectifier 525. The coil 522 is center tapped and is grounded at 522a so that full wave rectification of the modulating potential from the coil 522 is obtained with the rectifiers 525 and 526. Capacitors 581 and 582 are connected in parallel with the inductor 522 for causing the gradual high frequency roll off, as is well understood.

The coil 522 is a secondary winding of a transformer 520 which is connected to any suitable audio source; also, another secondary winding 580 forms a part of the transformer 520 and is connected in parallel with a variable resistor 541. The resistor 541 is connected to ground through a capacitor 583 and to the grid 510 through a radio frequency choke 521. The grid bias on the grid 510 is varied by the combined voltage across the variable resistor 541 and the resistor 515 so that the operating bias of the grid 510 decreases by a value of twice the peak amplitude of the applied modulating potential and increases back to its normal value during one cycle of the audio modulation. Such carrier wave output during one cycle of sine wave modulation corresponds with the graphic illustration at W in FIG. 13 of the drawings.

In order to maintain a balance of the operating grid bias to the grids 510 and 511, a resistor 513 of the same value as the resistor 515 is connected in series with a choke 550 to the grid 511. The plates 510a and 511a of the tubes T-1 and T-2, respectively, are connected with an output coil 551 which is in parallel with capacitors 552 and 553, with a ground at 554 therebetween. The coil or inductor is center tapped and is connected to a battery source 554 through a choke 555. A capacitance 556 is grounded and is connected in series with the choke 555.

Thus, with the method of modulation described in connection with the several embodiments of this invention, since the carrier is completely suppressed when no modulation voltage is applied to the transmitter, the power input efficiency is greater as compared to that of a transmitter using the conventional type of amplitude modulation.

Because the operating bias shift is inversely proportional to the audio modulating peak voltage, as previously described, the negative half cycle of the audio voltage cannot reduce the plate current of the modulated tube to zero, except at the very peak voltage value of the negative half cycle. Therefore, no over modulation can occur on the negative half cycle of the modulating voltage.

Thus, by means of the various forms of this invention, the need for re-insertion of carrier frequency at the radio receiver is eliminated because of the transmission of the carrier envelope with the amplitude variations and the wave form corresponding to the amplitude variations and the wave form of the audio modulating voltage.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for modulating radio transmission, comprising a source of radio frequency carrier voltage, an electrical circuit connected to said source for transmitting said voltage for reception by a radio receiver, means in said electrical circuit for suppressing said carrier voltage to thereby prevent the transmission of said carrier voltage in the absence of any impressed audio voltage, a source of audio voltage modulations, dividing means for electrically dividing said audio modulating voltage into a first audio voltage and a second audio voltage, converting means for electrically converting said first audio voltage from an alternating current voltage to a uni-directional voltage which is unaffected by frequency changes in said audio voltage modulations, means for adjusting the amplitude of the peak modulations of the second audio voltage to be the same as the amplitude of the uni-directional voltage, and means connected to said electrical circuit for simultaneously impressing the current from said uni-directional voltage and the current from the adjusted second audio voltage on said circuit for fully modulating the transmitted radio frequency carrier voltage in direct proportion to the amplitude of the audio modulating voltage and for varying the average value of the envelope of said carrier voltage at the frequency of the audio modulating voltage.

2. An apparatus for modulating radio transmission, comprising a source of radio frequency carrier voltage, an electrical circuit including a modulator means connected to said source for transmitting said voltage for reception by a radio receiver, means in said electrical circuit for suppressing said carrier voltage to thereby prevent the transmission of said carrier voltage in the absence of any impressed audio voltage, a source of audio voltage modulations, dividing means for electrically dividing said audio modulating voltage into a first audio voltage and a second audio voltage, converting means connected to said source of audio modulating voltage and said electrical circuit for electrically converting said first audio voltage into direct current voltage and for smoothing same, means also connected to said source of audio modulating voltage and said converting means and responsive to the frequency variations of said audio modulating voltage for attenuating the amplitude of said first audio voltage in proportion to the increases in the frequency of said first audio voltage and in an amount sufficient to cause the amplitude of the direct current to remain constant as the frequency of the first audio voltage at constant amplitude is varied, audio modulation transmitting means connected to said dividing means and said electrical circuit for transmitting the modulations of said second audio voltage to said electrical circuit, means for adjusting the amplitude of the peak modulations of said second audio voltage to be the same as the amplitude of the smoothed direct current throughout the audio frequency range, and means for simultaneously applying the current from said converting means and the current from said audio modulation transmitting means to cause the carrier output current to be in direct proportion to the combined amplitudes of the two currents so applied whereby the amplitude of the carrier voltage output from said electrical circuit is constantly in direct proportion to the amplitude of the audio voltage for thereby obtaining a 100% modulated carrier voltage with the average value of the carrier envelope varying at the frequency of the modulation voltage.

3. An apparatus for modulating radio transmission, comprising a source of radio frequency carrier voltage, transmission means including a modulator means connected to said source for transmitting said carrier voltage for reception by a radio receiver, suppression means connected with said transmission means for preventing the transmission of said carrier voltage in the absence of any impressed audio voltage on said transmission means, a source of audio voltage modulations, dividing means for electrically dividing said audio modulating voltage into a first audio voltage and a second audio voltage, converting means electrically connected to said source of audio modulating voltage for receiving and converting said first audio voltage into direct current voltage and for smoothing same, means also connected to said source of audio modulating voltage and said converting means and responsive to the frequency variations of said audio modulating voltage for attenuating the amplitude of said first audio voltage in proportion to the increases in the frequency of said first audio voltage and in an amount sufficient to cause the amplitude of the direct current to remain constant as the frequency of the first audio voltage at constant amplitude is varied, means for impressing said direct current voltage on said transmission means to vary the transmission of said carrier frequency in response to said direct current voltage, means for adjusting the amplitude of the peak audio modulating voltage to be the same as the amplitude of the smoothed direct current throughout the audio frequency range, and means for simultaneously applying the current from said converting means and the current from said audio modulation transmitting means to cause the carrier output current to be in direct proportion to the combined amplitudes of the two currents so applied whereby the amplitude of the carrier voltage output is constantly in direct proportion to the amplitude of the audio voltage and the average value of the envelope of said carrier voltage varies at the frequency of the audio modulating voltage.

4. An apparatus for modulating radio transmission, comprising a source of radio frequency carrier voltage, an electrical circuit including a modulator means tube connected to said source for transmitting said voltage for reception by a radio receiver, means in said electrical circuit for suppressing said carrier voltage to thereby prevent the transmission of said carrier voltage in the absence of any impressed audio voltage, a source of audio voltage modulations, dividing means for electrically dividing said audio modulating voltage into a first audio voltage and a second audio voltage, converting means including a rectifier and a first filter connected to said source of audio modulating voltage and said electrical circuit for electrically converting said first audio voltage into direct current voltage and for smoothing same, a second filter also connected to said source of audio modulating voltage and said converting means and responsive to the frequency variations of said audio modulating voltage for attenuating the amplitude of said first audio voltage in proportion to the increases in the frequency of said first audio voltage and in an amount sufficient to cause the amplitude of the direct current to remain constant as the frequency of the first audio voltage at constant amplitude is varied, audio modulation transmitting means connected to said dividing means and said electrical circuit for transmitting the modulations of said audio modulating voltage to said electrical circuit, means for adjusting the amplitude of the peak modulations of said second audio voltage to be the same as the amplitude of the smoothed direct current throughout the audio frequency range, and means for simultaneously applying the current from said converting means and the current from said audio modulation transmitting means to cause the carrier output current to be in direct proportion to the combined amplitudes of the two currents so applied whereby the amplitude of the carrier voltage output from said electrical circuit is constantly in direct proportion to the amplitude of the audio voltage and the average value of the carrier envelope varies at the frequency of the modulating voltage.

5. An apparatus for modulating radio transmission, comprising a source of radio frequency carrier voltage, a balanced modulator electrical circuit connected to said source of carrier voltage for suppressing said carrier voltage when no audio modulation is impressed thereon and for transmitting said voltage when audio modulation is impressed thereon, a source of audio modulating voltage, dividing means for electrically dividing said audio modulating voltage into a first audio voltage and a second audio voltage, converting means connected to said source of audio modulating voltage and said electrical circuit for electrically converting said first audio voltage into direct current and for smoothing same, means also connected to said source of audio modulating voltage and said converting means and responsive to the frequency variations of said audio modulating voltage for attenuating the amplitude of said first audio voltage in proportion to the increases in the frequency of said first audio voltage and in an amount sufficient to cause the amplitude of the direct current to remain constant as the frequency of the first audio voltage at constant amplitude is varied, audio modulation transmitting means connected to said dividing means and said electrical circuit for transmitting the modulations of said second audio voltage to said electrical circuit, means for adjusting the amplitude of the peak modulations of said second audio voltage to be the same as the amplitude of the smoothed direct current throughout the audio frequency range, and means for simultaneously applying the current from said converting means and the current from said audio modulation transmitting means to cause the carrier output current to be in direct proportion to the combined amplitudes of the two currents so applied whereby the amplitude of the carrier voltage output from said electrical circuit is constantly in direct proportion to the amplitude of the audio voltage and the average value of the carrier envelope varies at the frequency of the modulating voltage.

References Cited in the file of this patent

UNITED STATES PATENTS

| | | |
|---|---|---|
| 1,982,558 | Whitman | Nov. 27, 1934 |
| 2,076,787 | Laport | Apr. 13, 1937 |
| 2,090,820 | Wehrlin et al. | Aug. 24, 1937 |
| 2,192,967 | Evans | Mar. 12, 1940 |
| 2,432,512 | Davis | Dec. 16, 1947 |
| 2,969,508 | Jacob et al. | Jan. 24, 1961 |